March 27, 1973     D. SHEPHERD     3,723,340
METHOD FOR FOAM GENERATION
Original Filed Jan. 14, 1969
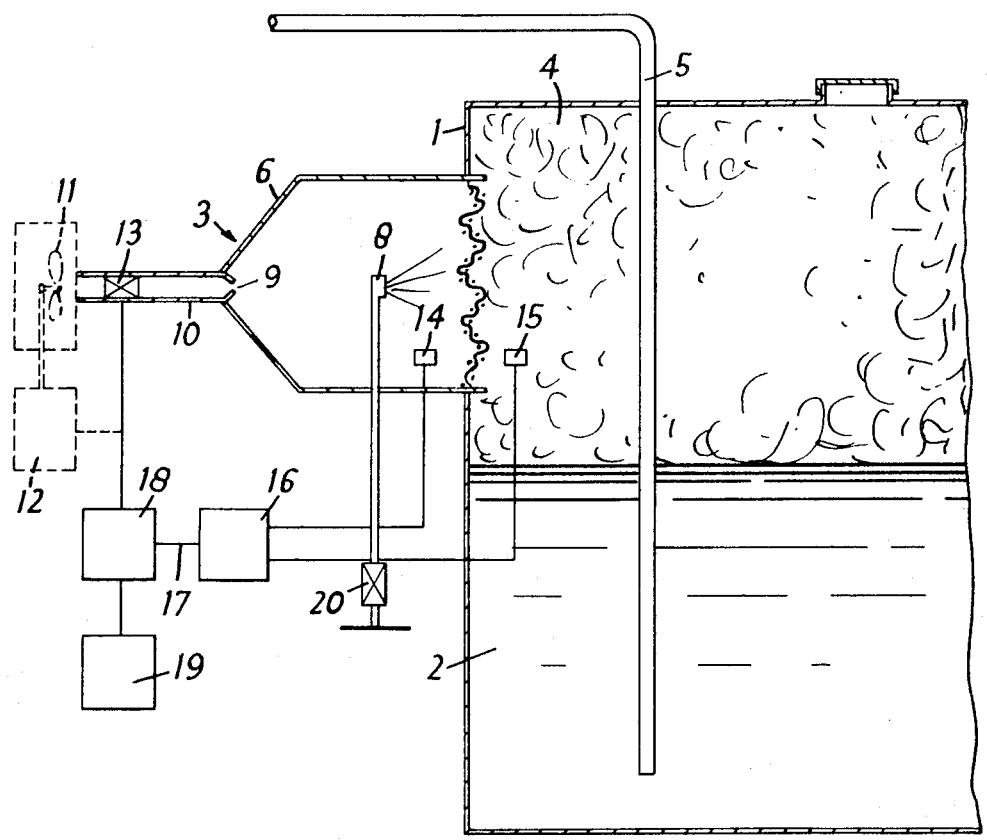

United States Patent Office
3,723,340
Patented Mar. 27, 1973

3,723,340
METHOD FOR FOAM GENERATION
Denis Shepherd, South Harrow, Middlesex, England, assignor to Walter Kidde & Company, Belleville, N.J.
Original application Jan. 14, 1969, Ser. No. 791,006. Divided and this application Nov. 1, 1971, Ser. No. 194,236
Claims priority, application Great Britain, Jan. 15, 1968, 2,208/68
Int. Cl. B01j 13/00
U.S. Cl. 252—307       5 Claims

ABSTRACT OF THE DISCLOSURE

A method of generating high expansion foam by spraying foaming agents onto a mesh through which gas (usually air) is blown. Pressure sensors on either side of the mesh sense the pressure differential across the mesh and through control means ensure a constant pressure differential despite changes in the back pressure.

---

This application is a division of my copending application Ser. No. 791,006, filed Jan. 14, 1969 entitled "Means for Foam Generation," which issued as United States Letters Patent 3,620,306 on Nov. 16, 1971.

The invention relates to a method for generating high expansion foam and a foam generator for utilizing the method.

According to one aspect of the invention there is provided a method of generating high expansion foam comprising the steps of controlling gas flow means to blow gas through a mesh, disposing on the mesh a solution of foam generating material, measuring the pressures on the upstream and downstream sides of the mesh and maintaining the pressure differential across the mesh substantially constant by controlling the gas flow means.

According to another aspect of the invention there is provided a foam generator for generating high expansion foam comprising controllable gas flow means, a mesh so arranged as to have gas from the gas flow means blown through it, dispensing means for disposing on the mesh a solution of foam generating material and two pressure sensors, one on the upstream side and the other on the downstream side of the mesh, the arrangement being such that the gas flow means may be controlled so as to maintain the pressure differential across the mesh substantially constant.

For efficient foam generation at a given rate of supply of foam generating material the rate of gas flow through the mesh should be within prescribed limits. Difficulties are encountered in situations where the back-pressure against the foam generator is variable as, for example, when filling an enclosed space with foam for fire prevention or extinction. If the foam generator has sufficient capacity to generate foam against a high back-pressure then there is a tendency for the gas velocity to be too high for efficient foam generation when there is little back-pressure. Conversely, if the generator is of limited capacity so as to generate foam efficiently at low back-pressures it will not operate efficiently at high back-pressures. The present invention allows efficient foam generation against a wide range of back-pressures and is therefore particularly effective in filling enclosed spaces such as mines and tunnels with foam.

Preferably the control of the gas flow means is automatic, there being provided control means to which outputs from the two pressure sensors are applied and which gives an error signal output proportional to the divergence from a datum of the difference between the two pressures, and means for applying the error signal to control the gas flow means, the gas flow means being controlled so as to reduce the error signal to zero.

The gas is usually air, although it may be carbon-dioxide or some other gas.

Conveniently the gas flow means comprises a fan, axial or centrifugal which is controllable in speed and/or pitch to vary the gas flow rate. Alternatively, or in addition, the control means may comprise controllable shutter means in the gas stream.

A particular novel use for the invention is found in discharging oil from a sea-going tanker. If there is a fire risk in such a tanker it is sometimes necessary to discharge oil rapidly. The present invention allows the discharge of oil to be effected by filling the tank with high expansion foam under pressure, the generation of foam being efficiently maintained despite changes in back-pressure.

The invention will further be described with reference to the accompanying drawing, which is a diagram illustrating an embodiment of the invention as used to discharge oil from a tanker.

Referring to the drawing there is shown a tank 1 in the tanker which holds oil 2. A high expansion foam generator 3 is sealed into the side of the tank near the top. In order to discharge the oil in an emergency the foam generator is activated to discharge foam 4 under pressure into the space above the oil and thereby eject the oil through a pipe 5 which has an inlet at the bottom of the tank and an outlet above the level of the tank. Thus, as the level of the oil in the tank falls the back-pressure required in foam 4 to eject the oil rises.

The foam generator comprises an expansion chamber 6 over the exit of which is arranged a mesh or net 7. A spray head 8 sprays a solution of a foaming agent in water on to the net. Air under pressure is ejected into chamber 6 from a nozzle 9 at the end of a conduit 10. The air may be derived from a fan 11 shown schematically in broken lines as being driven by a motor 12. Conduit 10 includes throttle control means comprising an electrically operated shutter 13. This regulates the flow of air into the expansion chamber.

A pressure transducer 14 is provided upstream of the net and a similar transducer 15 is provided downstream of the net. Signals therefrom representative respectively of the pressure upstream of the net and the pressure downstream of the net are applied to the inputs of a comparator 16. An output therefrom is given on line 17 representative of the difference between the pressures. This output is compared in a second comparator 18 with a reference datum signal derived from a reference datum generator 19. Any difference between the datum signal and the output from comparator 16 is given as an error signal from the output of comparator 18 and is applied to control shutter 13.

As is well known, a transducer such as 14 or 15 converts a mechanical (pressure) quantity into an electrical signal. The electrical signals from the two transducers are compared in comparator 16 which can be, for example, a differential amplifier or other similar well-known device. The output signal of the comparator 16 will have a magnitude and/or polarity which will be a representation of the difference between the upstream and downstream pressures. The signal from comparator 16 is applied to one input of a second comparator 18 which is, for example, another differential amplifier. The other input to the second comparator 18 is from a reference setting device 19 which can be, for example where a differential amplifier is used as the comparator 18, a suitable source of variable magnitude and/or polarity voltage. The signal from the device 19 is set to a level corresponding to a desired predetermined pressure differential between the upstream and downstream pressures. As should be apparent, this can be with the upstream pressure greater than the downstream pressure, as is usually the case, or vice versa, or the differential being equal to zero. The error signal produced by the comparator 18 is an error signal which is used to drive the shutter 13 to control the flow rate of the gas produced by the fan 11 which reaches the net 15 and thereby the pressure differential. As alternatives, the error signal can be used to control the speed of the motor 12 driving fan 11 or the pitch of the fan blades. Both of these actions will control the rate of gas flow.

The control arrangement is such that the error signal always tends to be reduced to zero and this means that whatever the back-pressure of foam 4, the pressure differential between transducers 14 and 15 is substantially constant, being determined by the setting of the datum generator 19. Thus, the optimum pressure differential for efficient foam generation is maintained despite large variations in back-pressure. This pressure differential may be, for example, about 2 or 3 p.s.i. and may be maintained against a back-pressure of 30 p.s.i. or so.

The foam generator may be fixed in position in the side of the tank with a removable guard or cover such as is disclosed in British patent specification No. 1,051,850 for protecting the mesh from the oil and preventing ingress of the oil.

I claim:

1. A method of generating high expansion foam comprising the steps of controlling gas flow means to blow gas through a mesh, disposing on the mesh a solution of foam generating material, measuring the pressures on the upstream and downstream sides of the mesh and maintaining the pressure differential across the mesh substantially constant by controlling the gas flow means.

2. A method for generating foam comprising the steps of disposing on a foraminous material foam generating material, flowing gas through the foraminous material to produce foam, measuring the pressures on both the upstream and the downstream sides of the foraminous material, controlling the flow of gas in response to the measured pressures to maintain a predetermined pressure differential across the foraminous material.

3. A method according to claim 2 further comprising the step of discharging the foam produced into an enclosure and measuring the downstream pressure in said enclosure.

4. A method according to claim 3 wherein said enclosure contains material therein, and further comprising the step of discharging the material from the enclosure as the generated foam is discharged into said enclosure.

5. A method according to claim 4 wherein the differential pressure across said foraminous material is maintained at a substantially constant level.

References Cited

UNITED STATES PATENTS

| | | | |
|---|---|---|---|
| 2,376,122 | 5/1945 | Clifford | 252—307 |
| 3,255,882 | 6/1966 | McCarthy et al. | 252—359.5 |

FOREIGN PATENTS

| | | | |
|---|---|---|---|
| 1,245,379 | 9/1971 | Great Britain | 203—20 |

JOHN D. WELSH, Primary Examiner

U.S. Cl. X.R.

252—3, 359 E; 261—DIG. 26